Oct. 18, 1932.                J. M. CHRISTMAN                1,883,567
                    FINISHING MACHINE FOR SMALL ARTICLES
                           Filed Feb. 18, 1930
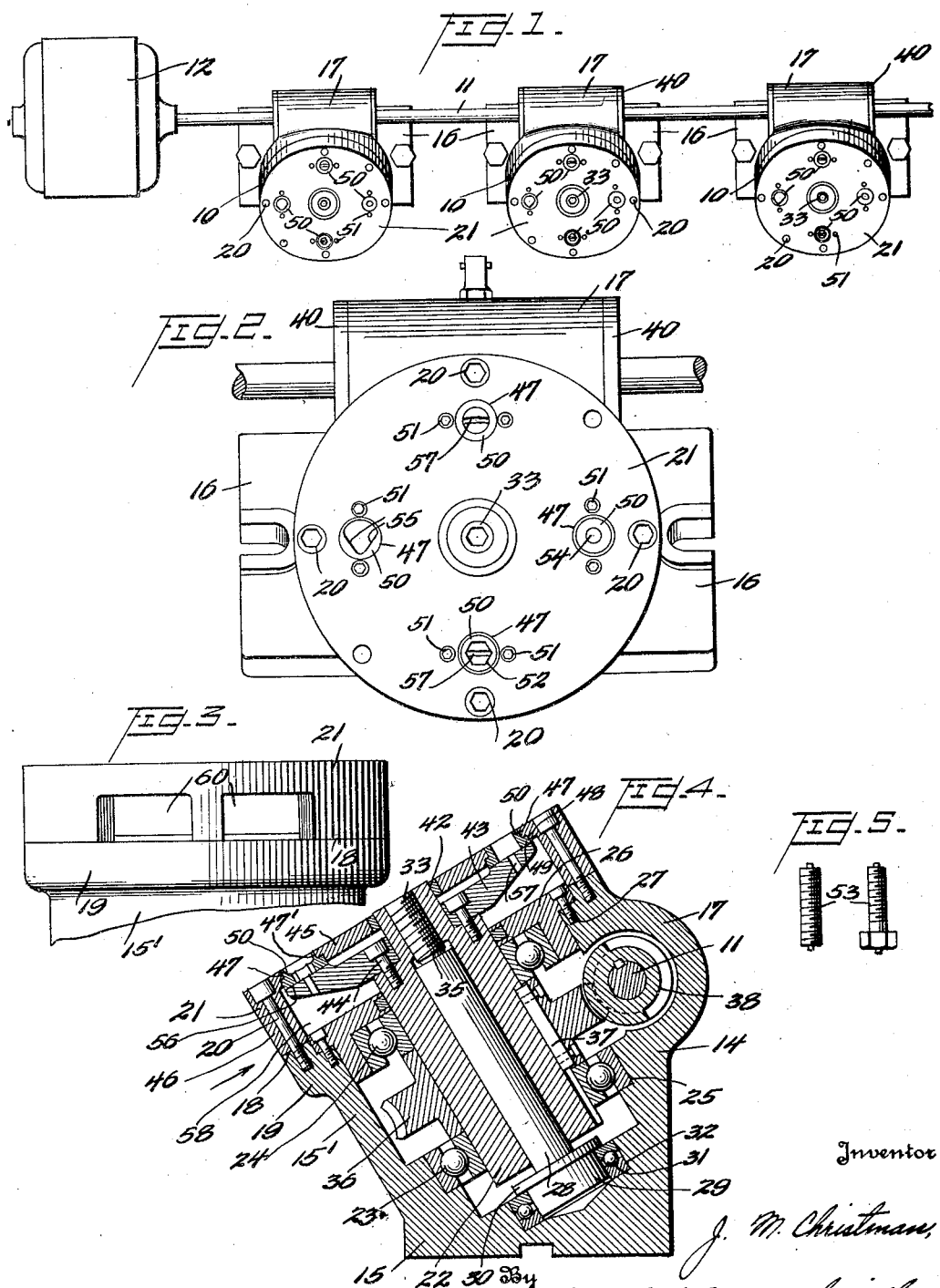
Inventor
J. M. Christman
By Watson, Coit, Morse & Grindle
Attorneys Patented Oct. 18, 1932

1,883,567

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

FINISHING MACHINE FOR SMALL ARTICLES

Application filed February 18, 1930. Serial No. 429,436.

This invention relates to machines for finishing small articles and particularly to machines for rapidly removing burrs or projections from such small parts as bolts, studs, threaded rods, rollers and the like.

It is a general object of this invention to provide a novel machine of the type described.

More particularly it is an object of the invention to provide a machine having a relatively stationary part for receiving small articles and a rotatable part for shearing burrs from these articles.

An important feature of the machine comprises the arrangement of a face plate with apertures to receive the articles to be worked on together with a moving shear disc which limits the passage of the articles through the face plate and removes burrs or projections from them by shearing.

Other and further features and objects of the invention are set forth in the accompanying drawing and following specification wherein is disclosed a single embodiment of the invention. It is to be understood that the invention is susceptible to such changes and variations in detail and use as fall within the scope of the appended claims without departing from the spirit of the invention.

In said drawings;

Figure 1 is a plan view of a group of machines of the type described, ganged together to be driven by a single source of power;

Figure 2 is a view taken at right angles to the face plate of a single machine;

Figure 3 is a view looking parallel to the surface of the face plate in the direction of the arrow in Figure 4;

Figure 4 is a fore and aft vertical section through the machine; and

Figure 5 are representative small articles upon which the machine is adapted to operate.

In the manufacture of small parts such as bolts, studs, threaded rods, rollers, pins and the like and particularly in the so-called "automatic screw machines" where a bar of stock is fed automatically and machined, the cut-off tool, which severs the finished articles from the remainder of the bar or rod of untreated stock, cuts a groove approaching the center of the bar, but the tool seldom reaches the center before the bar breaks off from the pressure of the tool, leaving on one or both ends severed by the tool a short burr or substantially cylindrical projection. These burrs must be removed before the articles are used, for not only is their appearance marred by these burrs, but oftentimes they hinder the use of the articles. It has been the practice heretofore to have workmen hold the pieces individually against suitable abrasive wheels to grind these burrs off, but this process is unsatisfactory in that it is slow, tedious and apt to unduly mar the surface of the bolt heads, for instance, if carried to a completion. Further, there is danger of the workman injuring his fingers in such an operation. The present invention contemplates a machine for performing this operation and other similar ones in a much quicker and more satisfactory manner, and at the same time eliminating all of the undesirable features of the older methods.

The new machine acts to shear off the burr by means of a rotating shear disc. Conveniently this shear disc is mounted in the small machines such as shown at 10 in Figure 1 which illustrates three machines constructed according to the present invention all driven from the single shaft 11 connected to a suitable source of power as the electric motor 12.

Each machine comprises a casting 14 including a base 15 having flanges 16 to permit the same to be secured to a suitable support, an inclined hollow column 15' and a driving worm housing 17. The top of the column is cut off at right angles to its axis as at 18 and provided with a thickened peripheral flange 19 to receive the ends of the studs 20 which secure the face plate 21 in position thereon.

Axially mounted in the inclined column is the sleeve member 22, journaled in the ball-bearings 23 and 24 near its lower and upper ends, respectively. The lower bearing is received in a recess 25 in the column and the upper one is held in position by means of the flanged collar 26 secured to the column by the studs 27. A shaft 28 is centrally mounted within the sleeve 22 and has a close fit therein. Its lower end is provided with an enlargement 29 and a flange 30 which cooperate with a thrust ball-bearing 31 mounted in a recess 32 at the bottom of the hollow column. A threaded rod 33 engages in a reduced opening in the upper end of the sleeve 22 and the inner end of this rod bears against the upper end of the shaft 28 as at 35. This permits adjustment of the sleeve axially of the shaft.

The sleeve and its attached parts are arranged for rotation and in order to impart this motion thereto, the sleeve is provided with a worm wheel 36 mounted on and keyed to the sleeve as at 37 between the inner races of the bearings 23 and 24. This worm wheel is engaged by a worm 38 in the housing 17 and mounted on the shaft 11 journaled in bearings 40 at the ends of the worm housing. This shaft may have power applied to it in any desired manner, for instance as shown in Figure 1.

Mounted on the reduced upper end 42 of the sleeve 22 is the shear disc 43 rigidly attached to the sleeve by means of the studs 44. This shear disc is adapted to rotate just below the face plate 21 previously mentioned. This face plate comprises the disc-like flat top portion 45 and the depending peripheral flange 46 which is bolted to the end of the column 11 by the studs 20. This face plate is provided with a plurality of holes therethrough as at 47. Four are shown in Figure 2 at the same distance from the center, but it is contemplated that any number may be provided and at varying distances from the center, preferably with two or more on the same circumference.

Each hole 47 in the face plate is counterbored on its under-surface as at 48 to receive the enlarged head 49 of a hardened steel bushing 50 which may have a pressed fit in the face plate, but is preferably also secured in position by the bolts 51 passing through from the front of the face plate.

Each bushing has an axial opening therethrough and there may be a number of styles of openings to accommodate various of the articles to be worked on. For instance, the bushing shown at the lower part of Figure 2 has a hexagonal opening 52 therein of such a size as to just receive the head of a bolt or stud as shown at 53 in Figure 5. The bushing at the right-hand side of Figure 2 has a small circular opening 54 therein of a size to just receive the shank of the bolt 53, whereas the bushing at the left-hand side of Figure 2 has a more or less triangular opening therethrough so that it will accommodate various sizes of circular rods. The inclined edges 55 of this opening will act as a V block to hold such articles in position and at right angles to the face of the face plate. This bushing is so positioned that the shear disc must rotate counter-clockwise as viewed in Figure 2. Each bushing may have its aperture somewhat enlarged as at 47' at the outer end to aid in guiding the work into position.

The shear disc is a suitable member of hardened tool steel having the annular face 56 which just clears the bottom faces of the bushings and is adjustable in this respect by means of the threaded rod 33 which shifts the sleeve 22 in respect to the shaft 28. This disc is perforated with a plurality of annular, segmental slots 57, the centers of which are on a radius equivalent to that of the centers of the holes in the bushings. The radial width of the slots is just slightly greater than that of the maximum diameter of any burr to be operated on. The ends of the slots may be undercut if desired to provide a sharp shearing or cutting edge, and the slots preferably have a considerable peripheral length.

In operation, the operator starts the machine, and grasps one or two of the articles to be finished, and presses them through the proper bushings in the face plate. The burrs on the ends pass into the slots 57 and are sheared off by the ends of the slots and fall through these slots into the space 58 beneath the shear disc. They then fall by gravity along the face of the flange 26 and drop out of the openings 60 in the flange 46 of the face plate. It will be noted that the flat upper surface of the shear disc forms a limiting stop to prevent the articles being worked on from being pressed too far through the bushings. When the burr has been sheared against the end surface of the article no further action will take place, and the operator will know this either by the feeling or the sound of the machine and can withdraw the article and replace it by a fresh one.

The column supporting the machine is inclined for two reasons. First, it presents the face plate at a convenient angle to the operator, and second, it permits the discharge of the removed burrs by gravity from the machine. If it is desired, the bushings can be made so deep that the articles can merely be dropped into position therein and will be fed by gravity until they are completely finished when no further cutting can take place.

Having thus described the invention, what is claimed as new and desired to be secured by Letters Patent is:

1. In a device of the type described, in combination, a face plate, a cutter member rotatable beneath said face plate, means to drive said cutter continuously, openings in said face plate to receive articles to be trimmed and to hold them stationary in respect to the cutter, said cutting member having cutting openings to periodically register with the face plate openings, each cutting opening being of less extent radially than any face plate opening.

2. In a machine for trimming burrs from bolts and the like, in combination, a stationary face plate, a cutter member adjacent to said face plate, means to rotate said cutter continuously in a plane parallel to the plate, a bushing in said plate having a perforation to receive a bolt or the like, the walls of the perforation restraining the bolt from lateral movement and the bottom of the perforation permitting engagement of the bolt end with said cutter, said cutter having segmental cutting openings to operate only on the burrs.

3. In a machine for trimming burrs from bolts and the like, in combination, a stationary face plate, a cutter disc adjacent said face plate, means to rapidly and continuously rotate said disc in a plane parallel to the plate, an opening through said face plate to permit the insertion of a bolt into engagement with the face of said disc, a series of cutting edges on said disc to engage a burr on the end of a bolt and shear it off and a face on said cutter to engage the main end of the bolt to limit its movement and prevent cutting thereof.

4. In a machine for trimming burrs from bolts and the like, in combination, a hollow column arranged for attachment to a base, a face plate closing the top of said column, a shaft journalled in said column at right angles to said face plate, a shear disc mounted on said shaft adjacent said plate, means to rotate said disc and means in said plate to permit the passage of a bolt or the like so that its end is engaged by said disc.

5. In a machine for trimming burrs from bolts and the like, in combination, a hollow column arranged for attachment to a base, a face plate closing the top of said column, a shaft journalled in said column at right angles to said face plate, a shear disc mounted on said shaft adjacent said plate, means to rotate said disc, means in said plate to permit the passage of a bolt or the like so that its finished end is engaged by said disc to limit its inward movement, and means on said disc to remove portions of the bolt which are less than its full area in cross section.

6. In a machine for trimming burrs from bolts and the like, in combination, a hollow column arranged for attachment to a base, a face plate closing the top of said column, a shaft journalled in said column at right angles to said face plate, a shear disc mounted on said shaft adjacent said plate, a worm wheel on said shaft, a worm engaging said worm wheel, a shaft journalled in said column and carrying said worm, means to drive said shaft and means in said plate to permit a bolt to be inserted to engage said disc for the purpose described.

7. In a machine for trimming burrs from bolts and the like, in combination, a hollow column arranged for attachment to a base, a face plate closing the top of said column, a shaft journalled in said column at right angles to said face plate, a disc mounted on said shaft adjacent said plate, means to rotate said disc, means in said plate to permit the passage of a bolt or the like to engage the disc and openings in said disc less in width than the diameter of the bolts or the like spaced to pass beneath said means.

8. In a machine for trimming burrs from bolts and the like, in combination, a hollow column arranged for attachment to a base, a face plate closing the top of said column, a shaft journalled in said column at right angles to said face plate, a disc mounted on said shaft adjacent said plate, means to rotate said disc, an opening in said plate to permit the passage therethrough of an article to be operated on, said disc being engaged by said article to limit its movement, said disc having cutting means thereon to engage a burr on said article to shear the same from the article.

9. In a machine for trimming burrs or the like from small metal objects, in combination, a hollow column, a face plate closing the top of said column, an opening in said face plate to permit the passage of an object therethrough, a sleeve journalled in said column at right angles to said face plate, means to rotate said sleeve, a shear disc on said sleeve beneath said plate, a shaft telescoped in said sleeve, a thrust bearing for said shaft at the end of the shaft remote from the disc, means to adjust the relative longitudinal positions of said shaft and sleeve to regulate the distance between the plate and disc and cutting means on said disc in the annular area passing beneath said opening.

10. In a machine for trimming burrs or the like from small metal objects, in combination, a hollow column, a closure member for the end of said column, an opening in said member to permit the passage therethrough of an object to be trimmed, a cutter arranged to operate on an object placed through said opening, bearings on said column to permit said cutter to be rotated and means to drive said cutter for the purpose described.

11. In a machine for trimming burrs or the like from small metal objects, in combination, a hollow column, mounted with its axis inclined, a face plate closing the end of said column and arranged at right angles to the axis thereof, an opening in said face plate, a cutter member beneath said opening and a chip guide beneath said cutter and parallel to said face plate.

12. In a machine for trimming burrs or the like from small metal objects, in combination, a hollow column, mounted with its axis inclined, a face plate closing the end of said column and arranged at right angles to the axis thereof, an opening in said face plate, a cutter member beneath said opening, means to rotate said cutter, means to permit chips to pass through the cutter, an inclined chip guide beneath said cutter and an opening beneath the face plate to permit the egress of chips from said guide.

In testimony whereof I hereunto affix my signature.

JOHN M. CHRISTMAN.